US005984772A

United States Patent [19]
Danieau

[11] Patent Number: 5,984,772
[45] Date of Patent: Nov. 16, 1999

[54] APPARATUS FOR CONTROLLING THE FLOW OF A STREAM OF AIR, IN PARTICULAR FOR A HEATING AND/OR AIR CONDITIONING INSTALLATION FOR A MOTOR VEHICLE

[75] Inventor: Jacques Danieau, Noisy le Roi, France

[73] Assignee: Valeo Climatisation, La Verriere, France

[21] Appl. No.: 08/824,161

[22] Filed: Mar. 26, 1997

[30] Foreign Application Priority Data

Mar. 29, 1996 [FR] France .................................. 96 04006

[51] Int. Cl.⁶ .................................................. B60H 1/24
[52] U.S. Cl. ............................................. 454/69; 251/901
[58] Field of Search .............................. 454/69, 121, 126, 454/156, 159, 160, 161; 251/129.11, 326, 901

[56] References Cited

U.S. PATENT DOCUMENTS

| | | | |
|---|---|---|---|
| 5,105,730 | 4/1992 | Smith | 454/161 |
| 5,243,830 | 9/1993 | Ito et al. | |
| 5,653,630 | 8/1997 | Higashihara | 454/156 X |

FOREIGN PATENT DOCUMENTS

| | | |
|---|---|---|
| 2580791 | 10/1986 | France . |
| 6 89 132 | 3/1946 | Germany . |
| 42.08966 | 9/1992 | Germany . |
| 195 32 662 A1 | 9/1995 | Germany . |
| 38 20 525 C2 | 6/1998 | Germany . |
| 211981 | 11/1968 | U.S.S.R. .............................. 251/901 X |
| 93/19946 | 10/1993 | WIPO . |

*Primary Examiner*—Harold Joyce
*Attorney, Agent, or Firm*—Morgan & Finnegan, L.L.P.

[57] ABSTRACT

An apparatus for controlling the flow of a stream of air consists of an independent module that comprises a support structure on which two rollers are mounted for rotation. A film, having open regions and closed regions, is wound between the two rollers, so that when the rollers are rotated to displace the film between the rollers, the relative positions of the open and closed regions of the film gives selective control of the flow of an air stream directed on to the film. The support structure includes a drive mechanism, for driving the rollers in alternate rotary motion and including a synchronizing shaft for synchronizing the rotary motion of the two rollers.

12 Claims, 1 Drawing Sheet

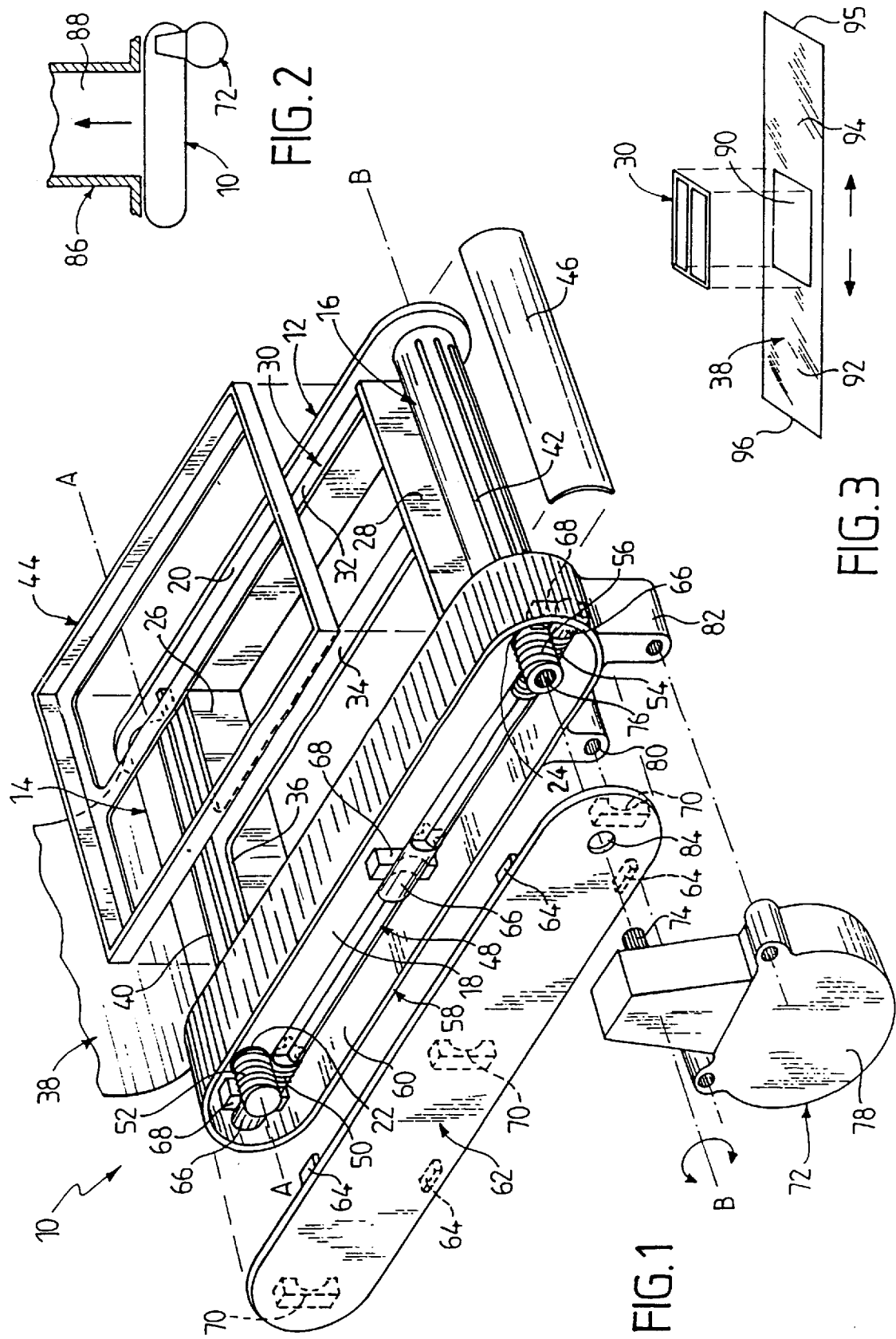

APPARATUS FOR CONTROLLING THE FLOW OF A STREAM OF AIR, IN PARTICULAR FOR A HEATING AND/OR AIR CONDITIONING INSTALLATION FOR A MOTOR VEHICLE

FIELD OF THE INVENTION

This invention relates to an apparatus, or air flow control device, for controlling the flow of a stream of air through an air passage aperture and the like, in particular for an installation for heating and/or air conditioning a motor vehicle.

BACKGROUND OF THE INVENTION

In installations of this kind it is necessary to provide at least one air flow control apparatus, or device, for controlling the flow rate of a stream of air passing through an aperture. The stream of air may, as the case may be, be either cold air, heated air, or conditioned air. This air passage aperture may be defined, in particular, by a duct, a distribution port, or other element of the system. It is usual to provide air flow control devices in the form of pivoting flap valves, which are typically of the curtain or butterfly type. Such flap valves can be actuated, in rotation, either manually or by means of a motorized drive. Such installations having flap valves have the major disadvantage that a relatively large amount of space has to be provided for displacement of the valve member (or flap), and this contributes to the space requirement of the heating and/or air conditioning installation within the vehicle. In addition, these types of pivoting valve have considerable resistance to the air flow, so that quite powerful motorized drives are needed for their operation.

It is also known, in particular from French patent specification No. FR 2 580 791A, to employ a control apparatus or device of the type comprising a film (also referred to as a blind or curtain), which is wound on two rollers spaced apart from each other. The film is arranged so that the portion of the film exposed between the two rollers is disposed across the air passage aperture through which the flow of air is to be controlled. The film is formed with suitable apertures, so that it has open regions through which air can pass, and solid or closed regions through which air cannot pass, so that displacement of the film by operation of the rollers, change the relationship between the open and closed regions of the film and the associated air passage aperture gives selective control of the flow rate of the air through that aperture. The film can thus be displaced in either one direction or the other, by winding it further on to one of the rollers and unwinding it at the same time from the other, thereby offering various options in the regulation of the air flow.

A device of the above kind may be referred to as a "film obturator". It has the drawback that its structure is somewhat complex. Moreover, the casing of the heating or air conditioning installation has to be specially adapted to enable the film obturator to be fitted within the casing. This in turn means that the casing of the installation then has a complex structure itself. In addition, it should be noted that known types of film obturator have to be specially designed to suit each particular type of casing of the installation. And quite apart from the above, fitting of the known film obturators involves lengthy and expensive assembly operations.

In addition, known apparatuses or devices of the "film obturator" type necessitate the provision of means for synchronizing the rotational motion of the two rollers, so as to ensure that the film unwinding from one of the rollers and winding on to the other, or vice versa, is displaced smoothly and evenly. Up to the present time, such synchronizing means comprise essentially a metallic wire which is wound around the two shafts of the respective rollers, together with means for tensioning the metallic wire. Such synchronizing means are complex and require somewhat delicate adjustment.

DISCUSSION OF THE INVENTION

A main object of the invention is to overcome the above mentioned drawbacks in film obturators.

According to the invention, an apparatus is provided in the form of an air flow control device, for controlling the flow of a stream of air through an air passage aperture, in particular for a heating and/or air conditioning installation for a motor vehicle. The apparatus is of the type comprising a film wound on two rollers spaced apart from each other, the film being adapted to extend across the air passage aperture. The film has open regions and closed regions for selectively controlling the flow of the said air stream according to the position of the film. The apparatus is characterised in that it is in the form of an independent module comprising a support structure on which the two rollers are mounted for rotation about parallel axes. The support structure carries a drive mechanism for driving the rollers in alternate motion, the drive mechanism including a synchronizing shaft for synchronizing the rotary motion of the two rollers.

Such a mechanism enables power to be transmitted from the axis of rotation of one roller to that of the other, regardless of the direction of rotation, and the two rollers are perfectly synchronized. In this way the tension in the film is perfectly controlled.

Preferably, the synchronizing shaft extends in a direction at right angles to the axes of rotation of the rollers, and carries two worms meshing respectively with two further worms, each of which is carried by the end of a respective one of the two rollers. These meshing worms give extremely accurate synchronization between the two rollers, and do not, moreover, require any particular adjustment operations.

According to a preferred feature of the invention, the drive mechanism is contained in a casing disposed along the support structure. This casing protects the drive mechanism from dust carried by the air stream. Preferably, the synchronizing shaft includes at least two cylindrical surfaces which are adapted to be received in at least two bearings carried by the support structure.

The synchronizing shaft is preferably splined, and preferably has three cylindrical surfaces which are adapted to be received in three bearings carried by the support structure.

Preferably, each bearing comprises a half bearing, fixed to a plate which forms part of the support structure and through which the axes of the rollers pass, together with a further half bearing which is fixed to a protective cover forming part of the above mentioned casing and adapted to be fixed to the support structure.

The casing preferably has a base through which the axes of the rollers pass, a side wall joined to the base, and a protective cover fixed to the side wall.

According to another preferred feature of the invention, it further includes a motorized drive unit, fixed to the support structure and including a drive shaft which is adapted to be coupled to one of the rollers. The drive shaft of the motorized drive unit is preferably splined, so that it can be introduced into a matching splined bore formed at one of the ends of one of the rollers.

The protective cover preferably has a hole through which the drive shaft of the motorized drive unit passes.

The above mentioned splined bore is preferably formed in the worm carried by one of the rollers.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 1 is an exploded perspective view of an apparatus consisting of an air flow control device in accordance with the invention.

FIG. 2 is a diagrammatic scrap view showing, in cross section, an air passage equipped with a flow control device according to the invention.

FIG. 3 is a perspective view showing diagrammatically a window of the flow control device in facing relationship with the corresponding film.

DESCRIPTION OF A PREFERRED EMBODIMENT OF THE INVENTION

The air flow control device or apparatus shown in FIG. 1 is made in the form of an independent module 10 constituting a cassette. The module 10 includes a support structure (or support frame, or chassis) 12 on which two rollers 14 and 16 are mounted. The first roller 14 is mounted for rotation about an axis A—A, while the other roller 16 is mounted for rotation about an axis B—B parallel to the axis A—A. The supporting chassis 12, which is preferably made of a suitable plastics material, comprises two opposed side plates 18 and 20, of elongate configuration. The side plates 18 and 20 are parallel to each other, and the axes of the rollers 14 and 16 extend through the side plates 18 and 20, in the region of the opposed ends of the latter, respectively. In particular, the respective axes of the rollers 14 and 16 pass through holes 22 and 24 in the side plate 18.

The two side plates 18 and 20 are joined together by means of two cross members 26 and 28 of the chassis, which are arranged parallel to each other and close to the rollers 14 and 16 respectively. The cross members 26 and 28 define, with the side plates 18 and 20, a generally rectangular opening, in which a window 30 is formed. The window 30 is bounded by two longitudinal elements, or longerons, 32 and two transverse elements or cross bars 36, and is divided by a central longeron 34. The longerons 32 extend respectively along the two side plates 18 and 20, only one of the elements 32 being visible in FIG. 1. Similarly, the two cross bars 36, only one of which can be seen in FIG. 1, extend along the two cross members 26 and 28 respectively.

The apparatus also includes a film 38 which is made in the form of a rectangular flexible band which constitutes a blind or curtain, and which includes open and closed regions as will be seen later herein. The film 38 has a width which corresponds to the space which is defined between the two side members 18 and 20, and is adapted to be engaged, at its ends, in appropriate longitudinal slots 40 and 42 which are formed in the rollers 14 and 16. The film 38 is thus able to be displaced along the window 30 in either direction, while being wound on to one of the rollers 14 or 16 and being unwound from the other, and vice versa. A press-frame 44 may be fixed to the support chassis 12 in facing relationship with the window 30, so as to hold the film in engagement against the window 30, thus preventing it from being deflected under the effect of the stream of air passing through the window 30.

The apparatus also includes two backing plates 46, only one of which can be seen in FIG. 1. These are of curved form and are arranged to be applied to the support chassis 12 so as to urge the film 38 against the respective rollers 14 and 16, thus preventing unwanted deformation of the film as it is wound on and off the rollers.

The two backing plates 46 are preferably held in position by means of respective cover plates of U-shaped cross section (not shown). These 25 cover plates enclose the two ends of the supporting chassis 12.

The two rollers 14 and 16 are driven, in rotation about their respective axes A—A and B—B and in synchronism with each other, by means of a synchronizing drive mechanism which drives each roller in reversible motion, i.e. in one sense of rotation or in the opposite sense, as required. This drive mechanism includes a synchronizing shaft 48 of cruciform cross section, which extends in a direction at right angles to the direction of the axes of rotation A—A and B—B. The synchronizing shaft carries at one of its ends a worm or gear element 50 in the form of a worm, which meshes with a second gear element 52, again in the form of a worm, which is fixed coaxially to the roller 14. At its other end the shaft 48 carries a further gear element 54 in the form of a worm, which meshes with yet another gear element 56 in the form of a worm, which is fixed coaxially, on the axis B—B, to the roller 16.

The reversible synchronizing drive mechanism is contained in a casing 58 which extends along the supporting chassis 12. The casing 58 has a base, which in this example consists of the chassis side plate 18, the roller axes A—A and B—B extending through the latter as mentioned above; together with a side wall 60 which is joined to the side plate 18 of the casing at right angles, and which is matched to the profile of the side plate 18. The casing 58 also includes a protective cover 62 which is secured to the side wall 60 by means of clipping lugs 64.

The synchronizing shaft 48, which is splined, includes three cylindrical surfaces 66, two of which are at the respective ends of the shaft, the third being in its central part. Each of these cylindrical surfaces 66 is received in a half bearing 68 which is fixed to the side plate 18 that constitutes the base of the casing 58, and in a half bearing 70 which is fixed to the cover 62. Thus, when the cover 62 is clipped on to the remainder of the casing 58, the shaft 48 is held in position by cooperation of the three half bearings 68 with the three half bearings 70.

The apparatus further includes a drive unit 72, consisting of a motor driven reduction gear unit. The drive unit 72 is arranged to be fixed with respect to the supporting chassis 12, and includes a splined drive shaft 74 which is introduced axially into a matching splined bore 76 formed in the adjacent end of the roller 16, on the axis B—B and, more particularly, in a bore formed in the worm 56. The drive unit 72 has a casing 78 which is arranged to be secured to two projecting fastening ears 80 and 82, respectively of the support structure 12, by means of screws or other similar fasteners (not shown). In this example, the two fastening ears 80 and 82 are formed on the outside of the side wall 60 of the casing 58. The drive unit 72 partly covers the protective cover 62, which is formed with a hole 84 through which the splined drive shaft 74 passes.

The various components of the apparatus are assembled together so as to form an assembled module 10. This module constitutes an independent unit which can readily be fitted within the casing of an installation, in a motor vehicle, for heating and/or air conditioning.

Reference is now made to FIG. 2, which shows an air passage 86, which in this example is a duct and which defines a transverse aperture 88. The module 10 of FIG. 1 is fitted across this air passage aperture 88. The module 10 is disposed in such a way that its window 30 (FIG. 1) lies in facing relationship with the aperture 88 in the air duct 86, the latter being generally rectangular.

Reference is now made to FIG. 3, which shows the film 38 in its unwound state, in facing relationship with the corresponding window 30. In this example, the film 38 has a rectangular open region 90 which is flanked by two solid, or closed, regions 92 and 94 of the film 38. Thus, the window 30, and consequently the aperture 88 in the air duct 86 (FIG. 2), may be completely open, or completely closed, or partially open, according to the position adopted by the film 38 relative to the window 30 and therefore the aperture 88.

The invention is of course not limited to the embodiment described above by way of example. It is possible to envisage other versions, as regards the structure of the support frame or chassis, and as regards the means for moving the film.

Again, the apparatus may be used for controlling the flow of one or more streams of air through one or more air passage apertures, by providing open and closed, or solid, regions in suitable locations on the film. In that case, the window can be divided into several apertures of selected forms, which are then arranged to be put into facing relationship with the apertures of the air passages to be controlled.

By virtue of its synchronizing shaft, the air flow control apparatus, or unit, of the invention enables perfect synchronization of the two rollers to be obtained. Thus, the film is kept under proper tension under all circumstances, and is not overstrained. The apparatus does not require any careful adjusting operations.

The apparatus of the invention is most particularly suitable for equipping passenger vehicles, such as motor cars, whether or not the vehicle has the option of air conditioning.

What is claimed is:

1. Apparatus for controlling the flow of a stream of air through an air passage aperture, the apparatus having two rollers spaced apart from each other and a film wound on the rollers, to define an exposed portion of the film between the rollers so that the film can be disposed with an exposed portion lying across an air passage aperture, the rollers being rotatable together whereby to displace the exposed portion of the film across the aperture, the film defining open and closed regions thereof for selectively controlling the air flow according to the position of the film relative to the aperture, wherein the apparatus is an independent module having a support structure defining two axes parallel to each other, each of the rollers being mounted for rotation on a respective one of the axes, drive means comprising a drive mechanism for driving the rollers in alternate rotary motion, the drive mechanism being mounted on the support structure and including a synchronizing shaft for synchronizing the rotary motion of the rollers.

2. Apparatus according to claim 1, wherein the synchronizing shaft extends in a direction at right angles to the axes of rotation of the rollers and carries two first worms, each of the rollers having an end carrying a second worm for meshing with a corresponding one of the first worms.

3. Apparatus according to claim 1, further, including a motorized drive unit fixed to the support structure, the drive unit including a drive shaft coupled to one of the rollers.

4. Apparatus for controlling the flow of a stream of air through an air passage aperture, the apparatus having two rollers spaced apart from each other and a film wound on the rollers, to define an exposed portion of the film between the rollers so that the film can be disposed with an exposed portion lying across an air passage aperture, the rollers being rotatable together whereby to displace the exposed portion of the film across the aperture, the film defining open and closed regions thereof for selectively controlling the air flow according to the position of the film relative to the aperture, wherein the apparatus is an independent module having a support structure defining two axes parallel to each other, each of the rollers being mounted for rotation on a respective one of the axes, drive means comprising a drive mechanism for driving the rollers in alternate rotary motion, the drive mechanism being mounted on the support structure and including a synchronizing shaft for synchronizing the rotary motion of the rollers further including a casing disposed along the support structure and containing the drive mechanism.

5. Apparatus according to claim 4, wherein the casing has a base through which the axes of the rollers pass, a side wall joined to the base, and a protective cover fixed to the side wall.

6. Apparatus according to claim 5, wherein the protective cover is fixed removably to the side wall.

7. Apparatus for controlling the flow of a stream of air through an air passage aperture, the apparatus having two rollers spaced apart from each other and a film wound on the rollers, to define an exposed portion of the film between the rollers so that the film can be disposed with an exposed portion lying across an air passage aperture, the rollers being rotatable together whereby to displace the exposed portion of the film across the aperture, the film defining open and closed regions thereof for selectively controlling the air flow according to the position of the film relative to the aperture, wherein the apparatus is an independent module having a support structure defining two axes parallel to each other, each of the rollers being mounted for rotation on a respective one of the axes, drive means comprising a drive mechanism for driving the rollers in alternate rotary motion, the drive mechanism being mounted on the support structure and including a synchronizing shaft for synchronizing the rotary motion of the rollers wherein the support structure carries at least two bearings, the synchronizing shaft having at least two cylindrical surfaces received in the bearings.

8. Apparatus according to claim 7, wherein the structure carries three bearings, the synchronizing shaft being of splined form and having three cylindrical surfaces received in the respective bearings.

9. Apparatus according to claim 7, wherein the support structure includes a plate, the axes of the rollers passing through the plate, the apparatus further including a protective cover fixed to the support structure, and spacing means carrying the protective cover spaced away from, and parallel with, the plate, each of the bearings having a first half bearing fixed to the plate and a second half bearing fixed to the protective cover.

10. Apparatus for controlling the flow of a stream of air through an air passage aperture, the apparatus having two rollers spaced apart from each other and a film wound on the rollers, to define an exposed portion of the film between the rollers so that the film can be disposed with an exposed portion lying across an air passage aperture, the rollers being rotatable together whereby to displace the exposed portion of the film across the aperture, the film defining open and closed regions thereof for selectively controlling the air flow according to the position of the film relative to the aperture, wherein the apparatus is an independent module having a support structure defining two axes parallel to each other, each of the rollers being mounted for rotation on a respective one of the axes, drive means comprising a drive mechanism for driving the rollers in alternate rotary motion, the drive mechanism being mounted on the support structure and including asynchronizing shaft for synchronizing the rotary motion of the rollers, further including a motorized drive unit fixed to the support structure, the drive unit including a drive shaft coupled to one of the rollers, wherein the one of the rollers has an end formed with a splined bore, the drive shaft being splined and engaged in the splined bore.

11. Apparatus according to claim 10, further including a protective cover fixed to the support structure in a plane at right angles to the axes of rotation of the rollers, the protective cover having a hole, with the drive shaft passing through the hole.

12. Apparatus according to claim 10, wherein the synchronizing shaft extends in a direction at right angles to the axes of rotation of the rollers and carries two first worms, each of the rollers having an end carrying a second worm for meshing with a corresponding one of the first worms, one of the second worms being formed with the splined bore.

* * * * *